Jan. 8, 1929.  
F. H. WOOD  
1,698,521  
SCREW DRIVING CHUCK  
Filed Jan. 26, 1926
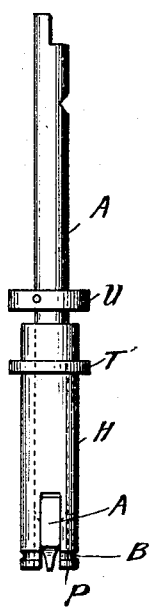
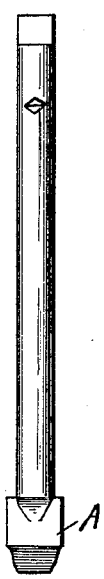
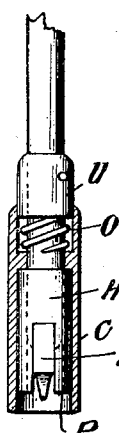
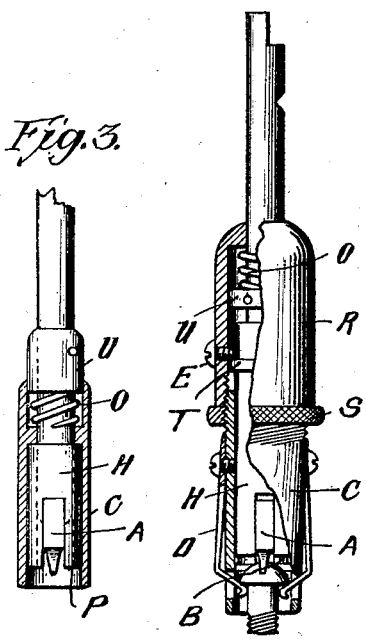
Frederick H. Wood  
INVENTOR.

Patented Jan. 8, 1929.

1,698,521

UNITED STATES PATENT OFFICE.

FREDERICK H. WOOD, OF CHICAGO, ILLINOIS.

SCREW-DRIVING CHUCK.

Application filed January 26, 1926. Serial No. 83,825.

The purpose of this invention is to provide a chuck for holding a screw and keeping it in proper contact with the driver while the screw is being driven. The claws which hold the screw have spring pressure to prevent breaking the screw or the tool.

They hold the screw firmly against a shoulder formed by the extremity of an attachment on the driver which has a slight play longitudinally to enable the tongue or bit of the driver to bear fully in the slot of the screw. The shoulder is formed for either a flat or a round headed screw and affords an even bearing for the top surface of the head of the screw to hold the screw in alignment with the driver, the shoulder of the attachment, being within the circumference of the screw head, is enabled to follow the screw into a counter-sink.

The claws are borne by an outer sleeve having a rotating and a longitudinal movement on the driver and its attachment. The claws are fastened to the outer surface of the outer sleeve and extend inwardly through slots or perforations in the lower part of the outer sleeve to grip the screw.

This outer sleeve extends beyond the claws to engage the head of the screw and keep the screw centered on the bit, and when the screw is nearly driven, touches the material the screw enters, ceases to revolve with the driver and moves backward on the driver releasing the claws and carrying them back on the driver as the screw is driven home.

The attachment to the driver comprises an inner sleeve slidable on the shank of the blade and having opposed vertical slots formed to receive and guide the shoulder of the blade, and when the outer sleeve moves backward on the driver, automatically pushed backward by contact with the material into which the screw is being driven, it draws the claws free from the screw and causes them to rest on the inner sleeve, leaving the end of the extremity of the outer sleeve open for the insertion of another screw. The movement of the outer sleeve in the direction of the bit causes the claws to glide from their resting place and over the head of the screw, engaging the screw.

Means is provided for adjusting the length of the outer sleeve, enabling the claws to extend further beyond the shoulder of the inner sleeve, to embrace screw heads of various thicknesses.

There is also means for holding the driver bit pressed into the slot of the screw, and means for holding the sleeve with the claws at an intermediate position convenient for inserting the screw or enabling the use of the tool with sleeve only and without the use of the claws.

The screw driving chuck is adaptable for a handle, or ratchet or brace, or with a flexible shaft, the purpose being to facilitate the driving of screws without moving the work.

Having described the purpose of my invention, the nature of which will be fully understood from the description I give below when considered in connection with the drawing in which the same letter denotes similar parts in each figure.

Figure 1 shows the screw driver with the attachment which forms the shoulder or bearing for the top surface of the screw head and which I designate as the inner sleeve.

Figure 2 shows the driver.

Figure 3 shows a modification of the device shown in the remaining figures and in which modified form may be used without claws attached to the outer sleeve.

Figure 4 shows the complete screw driving chuck and its several working parts.

Figure 5 represents an end view of the driver and its inner and outer sleeve.

In Figure 1 A is the screw driver, the upper shank designed for a handle or brace and its lower extremity flattened out to fit into the opposed vertical slots in the inner sleeve H, and having a shoulder for the inner sleeve to rest upon limiting its movement. The lower extremity terminates in a tongue or bit to engage the screw.

The longitudinal movement of the inner sleeve on the driver is limited also by the lug U pinned on the driver. The inner sleeve also has a lug T which engages a projection from the outer sleeve. The lower extremity of the sleeve H which is bored throughout to fit the driver A forms a shoulder P against which the screw is held. The inner surface of this shoulder may be slightly tapered or concave to conform to the top surface of a round headed screw, while its outer surface forms the shoulder for the top surface of a flat headed screw.

The driver A shown in Figure 2 can be formed like the ordinary screw driver but with a shoulder to engage the inner sleeve H.

In Figure 3 the driver A with its inner sleeve H is encased in an outer sleeve C which extends below the shoulder P to engage the screw. The spring O holds the outer sleeve and indirectly the inner sleeve in position but enables them to move backward on the driver when the outer sleeve encounters the material into which the screw is being driven.

The driver A having a slight longitudinal movement in the inner sleeve H is enabled to extend fully into slots of various sizes of screws either flat or round headed.

In Figure 4 R is an extension of the outer sleeve C with screw threads holding them together. The extension R can be locked at any point by the nut S. The screw E extends through the extension R contacting with the upper surface of the lug T on the inner sleeve H and enables the claws D to hold the screw which is being driven, firmly against the shoulder P of the sleeve H. The purpose of the extension R is to adjust the length of the sleeve C and enable its spring claws D to extend beyond the shoulder P and over the various thicknesses of screw heads and hold them firmly against the shoulder P.

The spring O presses the driver A into the slot of the screw and takes up any play of the driver in the inner sleeve H, but is not strong enough to interfere with the clutch of the spring claws D.

The outer sleeve and its extension may be pushed back on the driver until the spring claws rest in the groove B at the lower end of the inner sleeve H. In this position the screw may be inserted into the lower extremity of the chuck and turned until the bit of driver engages the screw, and then the outer sleeve may be moved downward until the spring claws slide over the head of the screw and hold it firmly against the shoulder P. The spring O will then hold the driver in contact with the screw until the screw is applied to the material into which it is to be driven. When the screw has been driven until the polished end of the sleeve C touches the material, sleeve C and its extension R will cease to revolve with the driver and will back onto the driver, releasing the claws D and carrying them back with it, but the sleeve C will continue to engage the head of the screw, keeping the screw and driver in contact until the screw is fully driven home, and the sleeve C pushed back on the driver flush with the shoulder P.

In Figure 5 A is the bit of the driver which engages the slot of the screw, P the extremity of the inner sleeve H, against which the screw head rests, its inner surface concave or slightly beveled to conform to the shape of the top surface of a round headed screw and its outer surface flat to conform to the top surface of the head of a flat headed screw.

Figure 5 also represents an end view of the modification shown in Figure 3.

I claim,—

1. The combination of a screw driver, a shoulder on the upper portion of the blade of the driver, a sleeve movable longitudinally on the driver, the end surfaces of the extremity of the sleeve conforming to the top surface of the screw head, affording an even bearing for the screw head, the shoulder of the blade limiting the movement of the sleeve in that direction, a second sleeve surrounding the first named sleeve rotatably and longitudinally movable on the driver and on the first named sleeve, the second named sleeve extending beyond the driver and beyond the first named sleeve to surround the head of the screw centering it on the driver.

2. An attachment for a screw driver blade in which the lower end of the blade is flattened to form a shoulder at a point near to and in the rear of the bit, comprising a sleeve slidable on the shank of the blade and having opposed vertical slots formed to receive and guide the shoulder of the blade, a second sleeve surrounding the first named sleeve and having spring claws fastened to its outer surface, said claws being adapted to extend inwardly through perforations in the lower part of said second sleeve to grip a screw, said second sleeve having its lower extremity extending below the lower extremity of the first named sleeve and below the claws, a spring surrounding the shank and situated between the upper end of the second named sleeve and a lug on said shank to normally keep the screw in engagement with the bit, and means for limiting the backward movement of the first named sleeve.

3. An attachment for a screw driver blade in which the lower end of the blade is flattened to form a shoulder at a point near to and in the rear of the bit, comprising a sleeve slidable on the shank of the blade and having opposed vertical slots formed to receive and guide the shoulder of the blade, a second sleeve surrounding the first named sleeve and having spring claws fastened to its outer surface, said claws being adapted to extend inwardly through perforations in the lower part of said second sleeve to grip a screw, said second sleeve having its lower extremity extending below the lower extremity of the first named sleeve and below the claws.

FREDERICK H. WOOD.